April 5, 1966    W. B. FEHRING ETAL    3,244,385
VEHICLE SOFT FIELD WHEELED SUPPORTING GEAR
Filed Aug. 21, 1964    5 Sheets-Sheet 1
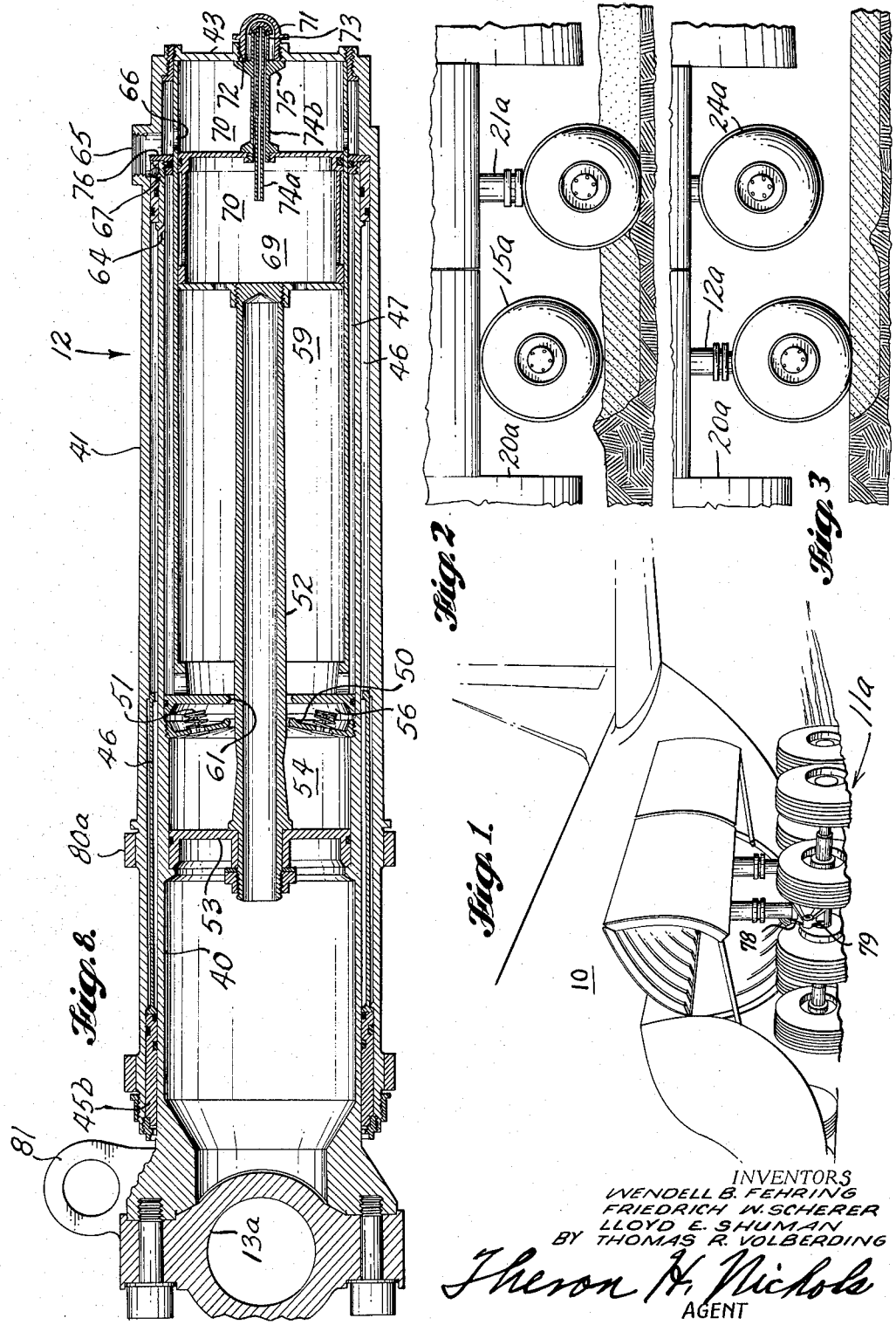
INVENTORS
WENDELL B. FEHRING
FRIEDRICH W. SCHERER
LLOYD E. SHUMAN
BY THOMAS R. VOLBERDING
Theron H. Nichols
AGENT

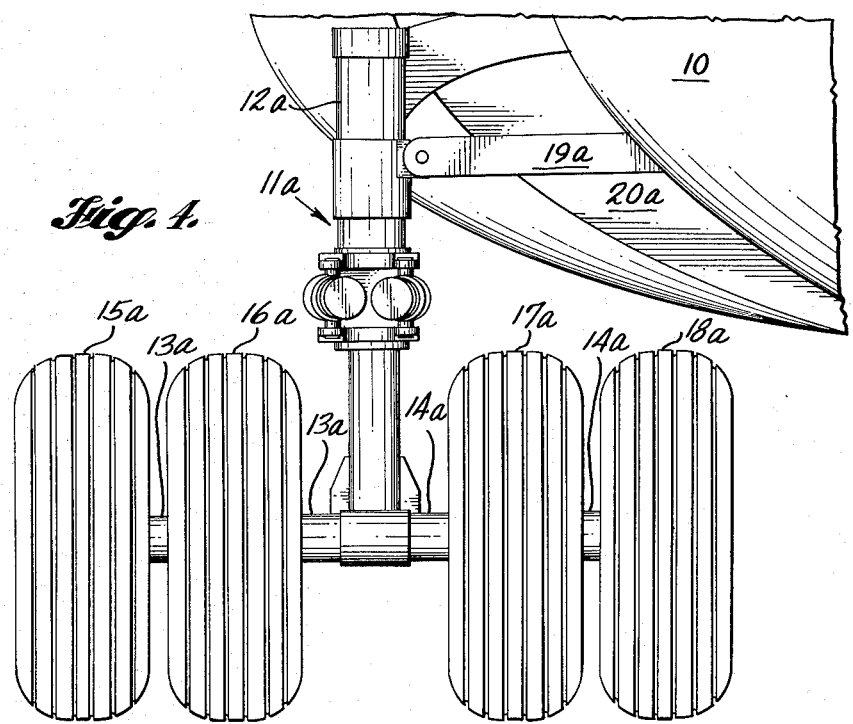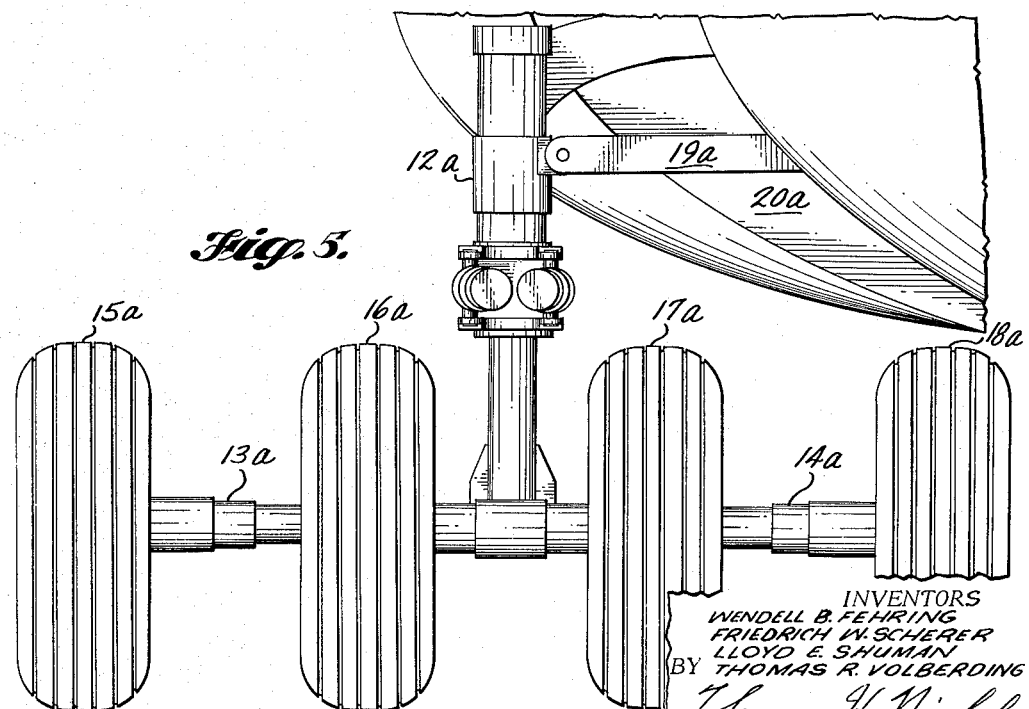

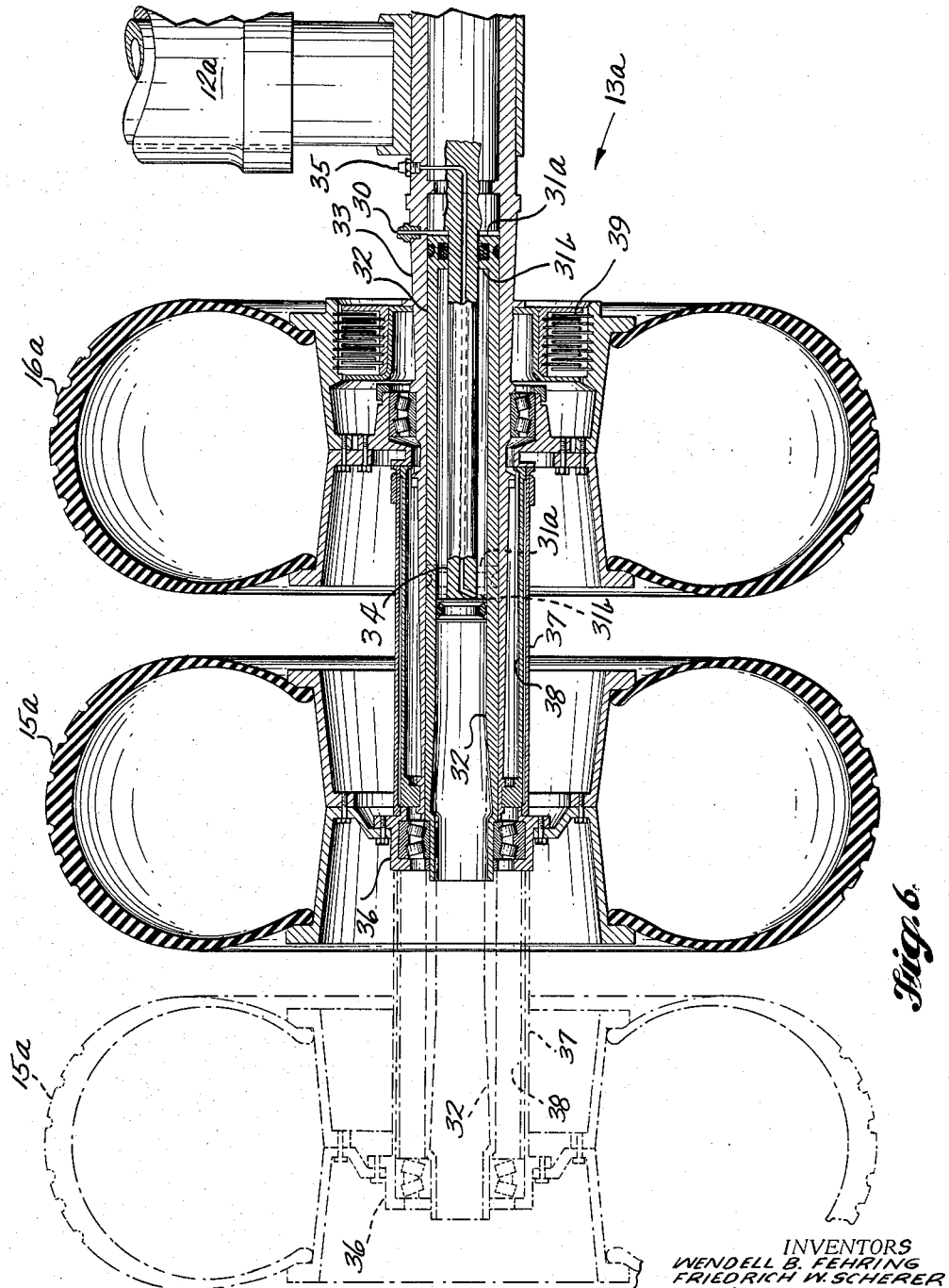

April 5, 1966   W. B. FEHRING ETAL   3,244,385
VEHICLE SOFT FIELD WHEELED SUPPORTING GEAR
Filed Aug. 21, 1964   5 Sheets-Sheet 4

INVENTORS
WENDELL B. FEHRING
FRIEDRICH W. SCHERER
LLOYD E. SHUMAN
BY THOMAS R. VOLBERDING

Theron H. Nichols
AGENT

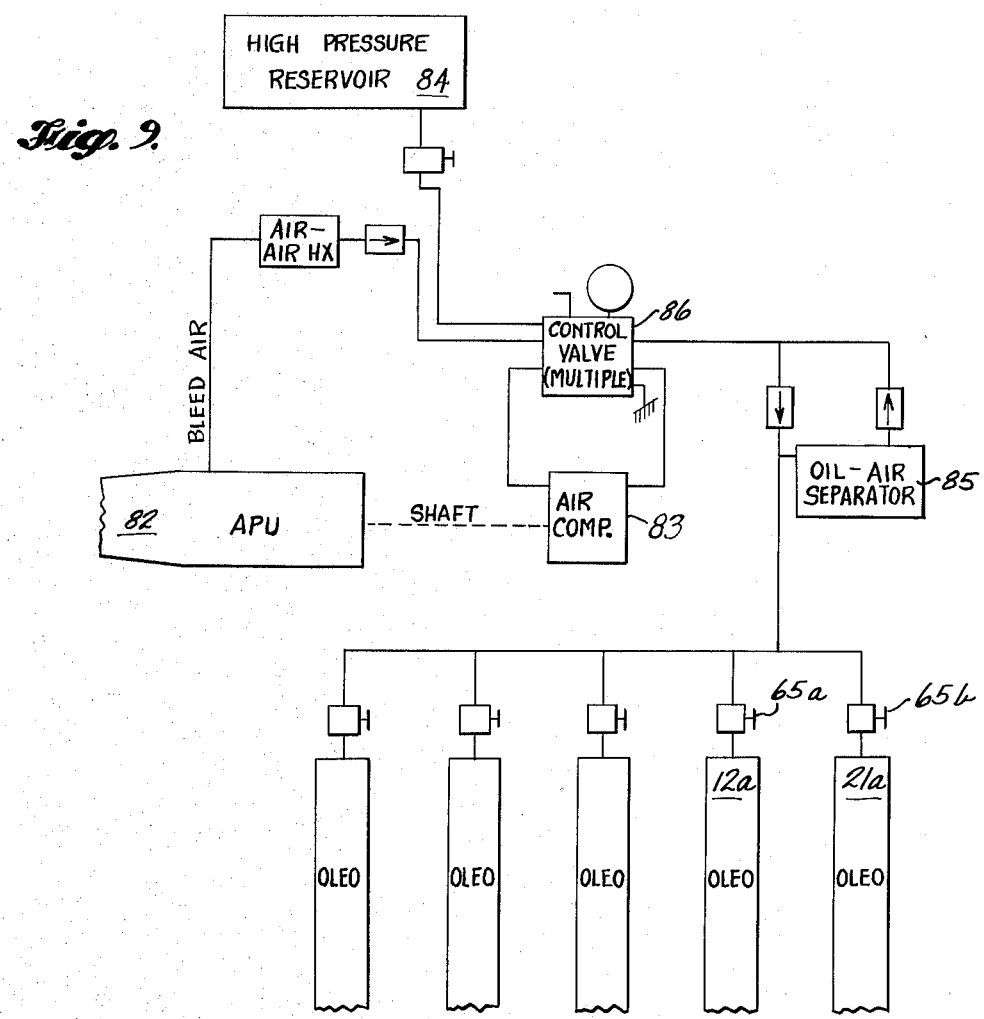

United States Patent Office 3,244,385
Patented Apr. 5, 1966

3,244,385
VEHICLE SOFT FIELD WHEELED
SUPPORTING GEAR
Wendell B. Fehring, Issaquah, Friedrich W. Scherer and
Lloyd E. Shuman, Seattle, and Thomas R. Volberding,
Bellevue, Wash.; said Fehring, Scherer and Shuman assignors to The Boeing Company, Seattle, Wash., a corporation of Delaware
Filed Aug. 21, 1964, Ser. No. 391,166
20 Claims. (Cl. 244—103)

This invention pertains to a wheeled supporting gear comprising a new axle and a new oleo shock strut for supporting a vehicle operable in and out of soft fields.

More particularly, this invention comprises a plurality of wheels mounted on controllable axially extendible axles supported by a controllable axially extendible oleo shock strut. On each side of the vehicle are usually a pair of shock struts, each strut having its own pair of axles. While all wheeled vehicles have their many and individual design requirements, the disclosed wheeled supporting gear may be used on various suitable vehicles, such as but not limited to, aircraft. Accordingly several embodiments of the invention, as applied to aircraft are disclosed hereinafter.

It is apparent that in order to land large airplanes on "soft" fields it is necessary to have more ground contact area spread over greater areas or distances than would be necessary for landing on "hard" fields. It is also obvious that an efficient landing gear, in reference to airplane drag in cruise and weight, must be compactly housed within the basic fuselage and/or creating the minimum extra frontal area. This design accomplishes these objectives.

For larger aircraft operating out of weak or soft fields, the lightest possible landing gear is desired for supporting the heavy loads.

Larger tire contact areas or tire prints are required. The usual solution to this requirement is the utilization of a multiplicity of soft tires. We prefer, instead, to employ at least two coaxially mounted wheels for each axle and two colinear axles per landing gear strut. The strut is a controllable extendible telescoping landing gear strut. The wheels are axially movable relative to each other at the bottom of the strut whereby the two wheels of each pair may be separated a distance of substantially four radii of the tire contact area for maximum supporting capability of heavy aircraft on soft landing fields.

Accordingly a primary object of this invention is to provide a soft field wheeled supporting gear having axially separable wheels for increasing the load carrying capabilities thereof, particularly for use on unimproved fields such as encountered in certain military operations.

Another primary object of this invention is to provide a soft field wheeled supporting gear having an extendible axle for axially separating the wheels thereon for increasing its load carrying capacity.

Another object of this invention is to provide a soft field wheeled supporting gear having an oleo strut that is both a superior shock absorber and a hydro-pneumatic actuator for permitting the raising of one side of the vehicle to facilitate changing of tires, removal of wheels from mire etc.

A further object of this invention is to provide, for heavy aircraft, an efficient and light weight soft field wheeled supporting gear having a wheel separating means for effectively increasing its supporting capability to more than double without adding any wheels and yet be retractible into a stowage cavity smaller than that required for the landing gear that would support an equal weight, and means for permitting control of the height of one shock strut or side of the aircraft relative to the other shock strut or side through its extendible shock absorbing struts.

A still further object of this invention is to provide an aircraft landing gear of axially movable wheels wherein the brakes on half of the wheels equally control the other wheels.

Yet another object of this invention is to provide a soft field wheeled supporting gear that has greater reliability and safety.

Other objects and various advantages of the disclosed vehicle soft field wheeled supporting gear will be apparent from the following detailed description, together with the accompanying drawings, submitted for purposes of illustration only and not intended to define the scope of the invention, reference being had for that purpose to the subjoined claims.

Briefly, this invention comprises a soft field wheeled supporting gear for a heavy vehicle, such as but not limited to, an aircraft. It comprises, for example, a landing gear having an axle with at least two wheels on the axle, the axle being controllable and extendible to separate the two wheels by a distance of approximately four radii of the tire contact area. The wheels are carried or supported by a controllable extendible landing gear strut, there being preferably, two tandem struts on each side of the aircraft, so that one strut may jack the aircraft up to clear the other strut and its wheel from the ground.

The drawings diagrammatically illustrate by way of example, not by way of limitation, one form of the invention wherein like reference numerals designate corresponding parts in the several views in which:

FIG. 1 is a perspective view of a mired large aircraft on a soft landing field;

FIG. 2 is a view similar to FIG. 1 showing the front landing gear wheels jacked up;

FIG. 3 is a view similar to FIG. 1 showing the rear landing gear wheels jacked up;

FIG. 4 is a rear view of the front strut, axle, and wheels of the left landing gear extended from the fuselage for hard field landings, but prior to extension of the wheel axles for landing on soft fields;

FIG. 5 is a view similar to FIG. 4, but with the wheel axles extended for operation on soft fields;

FIG. 6 is a detailed view with parts in section, of two wheels on an axle with the extended position of one axle and wheel shown in broken lines;

FIG. 8 is a view similar to FIG. 7 showing the strut in fully compressed position; and FIG. 9 is a block diagram of the oleo strut control system.

Figure 7:
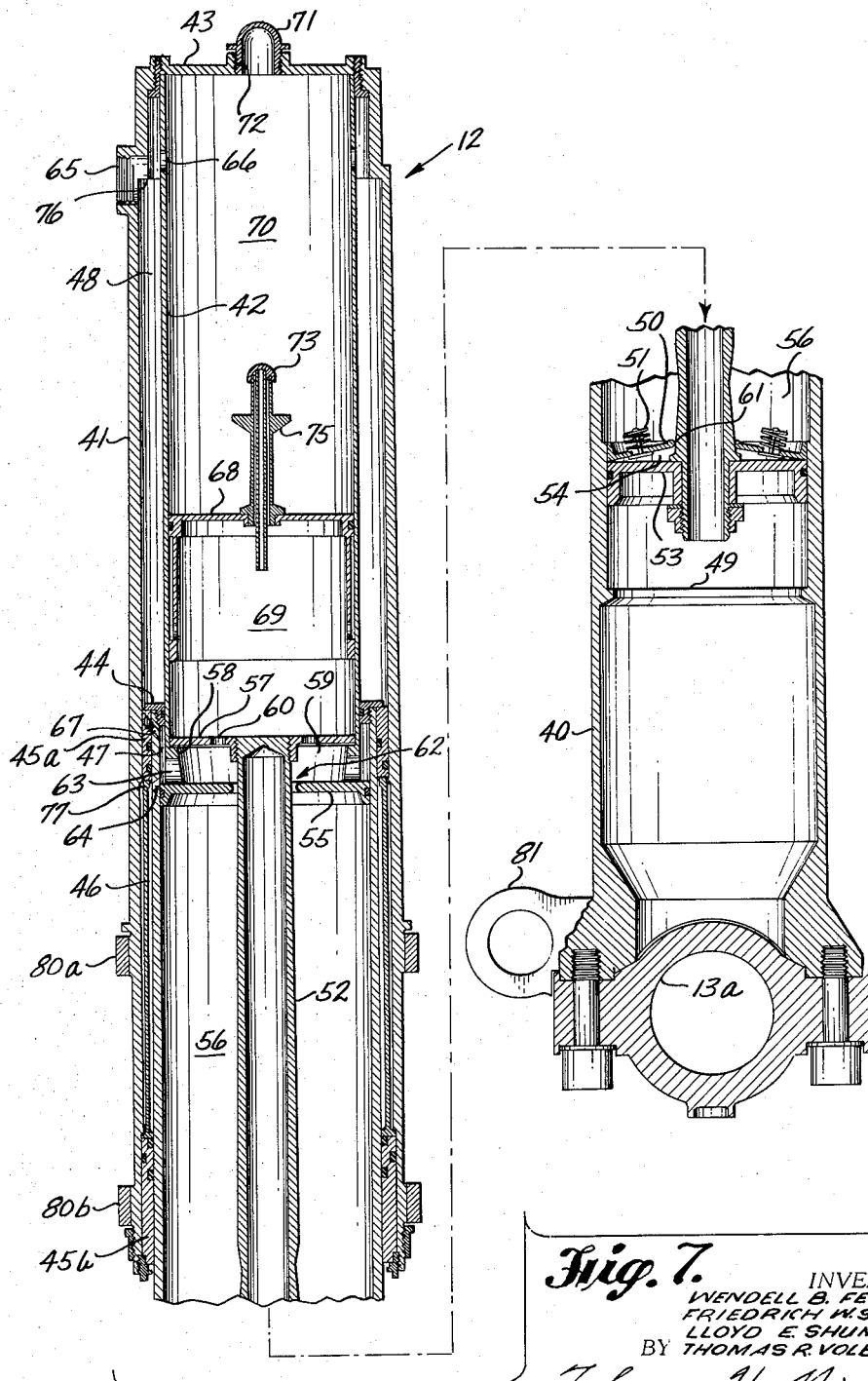
FIG. 7 is a detailed side view, with parts in section, of the controllable extendible strut in extended position preparatory to landing.

The invention disclosed herein is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

While the invention may be designed and used for various vehicles, it is shown here as applied to aircraft.

FIG. 1 shows the invention as applied to a large aircraft 10 having left and right landing gears 11a, 11b (not shown), wherein the wheels on the left landing gear have been mired down to an immovable conditon. The left landing gear, 11a, FIG. 4, in this example comprises both a forward controllable extendible oleo strut 12a and a similar aft controllable, extendible oleo strut 21a, FIG. 2, such as but not limited to a hydro-pneumatic strut, the forward strut, FIG. 4 having fixed wheels 16a and 17a, and controllable extendible axles 13a and 14a carrying wheels 15a and 18a. The oleo strut and components are retractable by retracting mechanism 19a into a wheel well 20a. The left landing gear similarly comprises the aft controllable extendible oleo strut 21a, FIG. 2 having fixed inner wheels, controllable extendible axles carrying outer wheels and an oleo strut being retractable by a retracting mechanism into the wheel well 20, all components on the aft strut being similar to the corresponding components on the forward strut. A typical axle is disclosed in greater detail hereinafter in FIG. 6, and a typical strut is disclosed in greater detail in FIGS. 7 and 8.

Upon activation of the invention, FIG. 2 on the left side of the aircraft, the forward oleo strut is locked against extension to permit raising of the forward four wheels out of the mire by extension of the aft oleo strut.

After the ruts are filled, the left forward oleo strut 12a, FIG. 3 is lowered to the ground and the left aft oleo strut is locked against extension to permit raising of the aft four wheels from the mire by extension of the forward oleo strut. Then after the ruts under the raised wheels are filled, the wheels are lowered and the aircraft moved to more solid ground.

FIG. 4 is a rear view of the front strut 12a having axles 13a and 14a with wheels 15a, 16a, 17a, and 18a of the left landing gear 11a, all retractable by retracting mechanism 19a into wheel well 20a, the wheel axles being shown in contracted position for hard field landings. In this position the wheels, like the conventional dual wheel landing gear will support a given weight on a hard surface, such as reinforced concrete, but will seriously damage or sink in a soft field. The supporting capabilities are greatly increased, as shown by FIG. 5 by extendible axle 13a moving outer wheel 15a outwardly and extendible axle 14a moving outer wheel 18a outwardly from their respective inner wheels 16a, and 17a. The wheels are thus spread apart such a distance that the effect of wheel interaction no longer exists. This distance is deemed to be substantially four radii of the tire contact area.

While the landing gear for each side is disclosed as comprising two extendible oleo struts and each strut having two extendible axles, if so desired and designed, clearly one strut having only one axle with two wheels thereon may be utilized. Or, more than two extendible struts may be utilized, if so desired on each side of the aircraft, each strut having a truck of extendible axles, as four or more for example.

While any suitable conventional landing gear retracting mechanism 19a or 19b may be employed, the wheel well spaces 20a or 20b required for the contracted wheels is much less than that required for the greater number of wheels and axle required to provide the same support of the disclosed extendible axle landing gear.

Details of one embodiment of the extendible axle are illustrated in FIG. 6 wherein the contracted wheels 15a and 16a on axle 13a supported by strut 12a may be separated by application of fluid under pressure to fluid conduit 30. This fluid pressure, acting on the inside face 31a of the hollow piston 32 forces the piston to move axially in a cylinder 33, the piston being slidable on rod 34 integral with the outer cylinder permitting the fluid to exhaust through conduit 35.

With the outer wheel 15a rotatably mounted in suitable bearings on the outer end 36 of the piston 32, fluid pressure in line 30 from a suitable control source (not shown) extends the piston and cylinder forming the extendible axle to separate the wheels by the preferred or distance of substantially four times the radii of the tire contact area. Suitable locks may be used on the wheel axle to lock the extendible axle in any position or degree of extension from fully contracted to fully extended.

On one test strip of ground the two wheels, when in juxtaposition with each other supported a maximum weight of 1,000 pounds before the wheels rutted the surface of the ground to an unusable degree. Then on the same strip of ground the wheels were moved to the extended position of four radii of the tire contact area by actuation of the disclosed extendible axle, and a weight of over 2,600 pounds was supported before the tires broke up the surface of the ground to the same unusable degree.

After take-off and prior to retraction of the landing gear, fluid under pressure is switched at the fluid control source (not shown) from conduit 30 to conduit 35 and thus supplying the high pressure fluid to the outside face 31b of the piston inner end. Piston 32 is then actuated inwardly of the cylinder 33 to contract the extendible axle 13a and move the wheels close together for retraction of the landing gear into the small wheel well 20a. The fluid, in this operation is thus exhausted from conduit 30 back to its source.

A spline and groove connection is formed between outer torque tube 37 connected to the outer wheel 15a and inner torque tube 38 concentric therewith and connected to inner wheel 16a. With conventional disk brakes 39 mounted in inner wheel 16a, all braking effort is transmitted between the inner and outer wheels because of the sliding splined torque tube connection therebetween.

Since the landing gear 11a on the left side of the aircraft is the allochiral analogue of the landing gear 11b on the right side of the aircraft and likewise, because the forward portion of each of the landing gears, as strut 12a, axles 13a, 14a, wheels 15a, 16a, 17a, 18a, and retracting mechanism 19a, for example is the allochiral analogue of its aft portion as strut 21a, axles 22a, 23a, wheels 24a, 25a, 26a, 27a, and retracting mechanism 28a, only one strut 12a, for example is illustrated in FIGS. 7 and 8.

The controllable extendible strut 12, FIGS. 7 and 8 provides the dual purpose of being an oleo shock strut capable of providing cushioning and snubbing for operation on all types of fields, and of being collapsible or extendible for the raising of one side of the aircraft.

*Inner, outer, and guide cylinders*

FIG. 7 illustrates one of the landing gear struts, as the landing gear strut 12a per se, for example, after being extended from the aircraft in preparation for landing. Upon contact of the wheels with the ground, axle 13a being fixed to the lower end of inner main cylinder 40 telescopes the cylinder within outer main cylinder 41. A guide cylinder 42 having a diameter slightly less than that of the inner cylinder 40 is attached to the top 43 of outer cylinder 41 and extends down to form with the outer cylinder a guide channel for receiving the upper edge 44 of the inner cylinder 40. With the addition of an upper bearing 45a to the upper edge 44, and a lower bearing 45b connected to the lower edge of outer cylinder 41, the oil below the edge 44 in annular chambers 46 and 47 is sealed from the air above in annular chamber 48. Fixed to and internally of the lower end of inner cylinder 40 are an integral ring or stop 49 and above that at a predetermined distance is a fixed but adjustable secondary annular orifice plate 50, the latter having one or more relief or by-pass valves 51.

Stop 76, FIG. 7, adjacent inlet port 65 in the upper portion of outer cylinder wall 41 limits the upward travel of inner cylinder 40 relative thereto. Stop 77, adjustably mounted internally of the lower portion of outer cylinder 41, likewise limits the downward travel of inner cylinder 40 relative to outer cylinder 41.

*Orifice rod*

An orifice metering rod 52, FIG. 7, floats, i.e., has freedom of motion in the axial direction, and is maintained centrally of inner cylinder 40 by orifice rod piston 53. Piston 53 slides in a liquid-tight fit internally of inner cylinder 40 in the predetermined distance between stop 49 and orifice plate 50 to form an annular chamber 54. The orifice rod 52 itself has a greater taper in the predetermined distance up from the bottom in the portion thereof which meters fluid past the orifice plate 50 than the taper of the rest of the rod, particularly in the top of the rod protruding through the orifice ring or plate 55 attached to the lower end of the guide cylinder 42. An annular fluid chamber 56 is formed between rod 52 and inner cylinder 40, and orifice plates 50 and 55. The top of orifice rod 52 has fixed thereto a guide plate 57 in sliding engagement with guide cylinder 42, the downward movement of orifice rod 52 being limited by a stop ring 58 internally of guide cylinder 42 and the upward movement of the orifice rod being limited by its piston 53 contacting the orifice plate 50 on inner cylinder 40 which in turn is limited by step 76 or by piston 68 and its stop 75 against the cylinder top 43. An annular chamber 59 is formed between the vertical walls of the upper portion of rod 52 and the lower portion of guide cylinder 42 between orifice ring 55 and guide plate 57.

Orifices

Guide plate 57, FIG. 7, has one or more orifices 60 therein. Orifice metering rod 52 forms variable metering orifices 61 and 62 with the annular orifice plate 50 and orifice ring 55, respectively. Fixed passage of orifice 63 is formed in the bottom of guide cylinder 42 for connecting annular chambers 47 and 59, and orifices 64 are formed in the top of inner cylinder 40 connecting annular chambers 46 and 47.

An air inlet valve 65a, FIG. 9 is inserted in inlet or port 65, FIG. 7 in outer cylinder 41 and adjacent thereto are formed air passages 66 in the upper wall of guide cylinder 42. An air bleed passage 67 is provided at the top of inner cylinder 40.

Air-oil separating piston

A floating piston 68, FIG. 7, i.e., with freedom of motion in the axial direction is mounted internally of guide cylinder 42 and is operable between guide plate 57 and the top 43. This piston 68 separates the oil in the cylindrical chamber 69 formed below the piston from the air in the cylindrical chamber 70 above the piston.

A screw cap 71 seals the access opening 72 in the top 43. Cap 73 permits topping off of the oil when filling the shock strut through inner tube 74a, the displaced air egressing from overflow tube 74b. Likewise, stop 75 is formed on tube 74b for limiting upward movement of the floating piston 68.

All moving parts have O-rings, or similar seals for maintaining fluid-tight connections where desired.

Wheel centering means

The adjustable stop 77, FIG. 7, for limiting the downward and outward movement of inner cylinder 40 from outer cylinder 41 likewise has a V-shaped cam groove to fit similar V-shaped follower lobes or cams around the lower periphery of annular upper bearing 45a for always rotating or centering the wheel axle carrying cylinder 40 relative to main and upper cylinder 41.

Also scissor links 78 and 79, FIG. 1 may be connected to upper fittings 80a, 80b, FIG. 7, on the lower end of upper main cylinder 41 and to lower fitting 81 on lower main cylinder 40 for proper alignment of the cylinders relative to each other.

Oleo filling procedure

With the strut unpressurized and cylinders 40 and 41 completely telescoped or contracted as shown in FIG. 8, and with the plug from bleed passage 67 removed, the latter being accessible from inlet 65, the caps 71 and 73 are removed and oleo fluid poured into tube 74a. As the fluid flows in tube 74a and fills chambers 54, 56, 59, and 69, the air escapes from the annulus between tube 74a and the overflow tube 74b. As annular spaces 46 and 47 fill, the air here escapes from the opened bleed passage 67. After closing the bleed passage 67, topping off the overflow tube 74b, and replacing the caps 71 and 73, inner cylinder 40 is extended from outer cylinder 41 to the position illustrated in FIG. 7, and air blown in air inlet valve 65a to the proper pressure.

Operation of strut—initial ground contact

FIG. 7 illustrates the shock strut ready for a load to be applied thereto, as an aircraft landing. Upon the wheels contacting the ground, inner cylinder 40 immediately begins to telescope into outer cylinder 41 whereby upward movement of orifice plate 50 pressurizes fluid in chamber 56, starts metering fluid through metering orifice 61 into chamber 54 and through metering orifice 62 into chamber 59. As pressure builds up, depending on rate of fluid flow through metering orifices 61 and 62, by-pass or relief valve 51 opens. Initial energy absorption is thus provided. Due to oleo air pressure in chambers 70 causing a fluid pressure in chamber 69, orifice metering rod 52 remains extended downwardly as limited by stop 58 until inner cylinder 40 has moved upwardly the predetermined distance as established by stop 49. The initial ground contact load prior to the metering rod being picked up or moved by inner cylinder 40 is based on the area of the annulus 48 instead of area of the whole inner cylinder 40. This provides a low sink rate landing of the airplane with little tendency to rebound into the air because any reverse movement of inner cylinder 40 and orifice plate 50 downward is dampened by closing of by-pass valve 51, if it had opened, and by the metering action of fluid flow back through orifices 61 and 62.

Operation of strut—full load on ground

As full weight of the aircraft is placed on the landing gear and upon contact of stop 49, FIG. 7, with orifice metering rod piston 53, the rod is carried upwardly farther for additional energy absorption by forcing oleo fluid from chamber 69 through orifice 60 to chamber 59 and fluid from chamber 56 is forced through variable metering orifice 62 into chamber 59, fluid from chamber 59 passes through orifice 63 into chamber 47, and from chamber 47 through orifice 64 into chamber 46 providing increased resistance to telescoping of main cylinders 40 and 41.

While orifices 60, 63, and 64 absorb a particular amount of energy, variable orifice 62 is of primary importance as the air in chambers 48 and 70 is compressed by upward movement of inner cylinder 40 and piston 68 in absorbing the remaining energy of the landing.

Operation of strut as a jack

To jack up one set of wheels for any reason on one side of the aircraft, high pressure air, at approximately 4,000 pounds per square inch in the disclosed example is injected into chambers 48 and 70, FIG. 7, from air valve 65a, FIG. 9, for forcing down floating piston 68, FIG. 7, main inner cylinder 40, and orifice metering rod 52 to their respective fully extended positions. Floating piston 68, upper bearing 45a, and upper edge 44 and their seals prevent the high pressure air from saturating the oil, which would then "boil" when the pressure was released. Lowering of the raised wheels may be accomplished by release of the required amount of air from the valve 65a, FIG. 9.

FIG. 9 discloses a typical or conventional control system for operation of each of the new struts comprising the conventional elements of an auxiliary power unit 82 for driving an air compressor 83, a high pressure air reservoir 84, an air oil separator 85, and a multiple control valve 86 interconnected to all elements in the conventional manner for supplying a controlled amount of high pressure air to and from any one of the disclosed oleo shock struts. If the forward oleo strut 12a were required to be raised, for example, the air valve 65a on this strut is opened, the air valve 65b on the aft oleo strut 21a directly behind strut 12a being closed, and the air pressure in the control valve from strut 12a is vented to the atmosphere thereby shifting its load to strut 21a. Then after the collapsed strut 12a is secured or locked against extension by any suitable conventional means (not shown), additional air is applied to strut 21a through valve 65b from the reservoir 84 (4,100 p.s.i. for example) and compressor 83 to raise the tires and axles on strut 12a. After the tire is changed, ruts filled, or repairs made, etc., then the strut 12a is unlocked and valves 65a and 65b opened to equalize the pressure in both struts. Proper pressure in both struts 12a and 21a is obtained by regulation of control valve 86. After closing of valve 65a the oleo strut 12a is in operable condition.

Accordingly a soft field wheeled landing gear has been disclosed for supporting heavy loads on soft fields comprising a new axially extendible axle for separating the wheels for increased load carrying capacity, a new shock strut, and a strut that may be telescoped for jacking.

While only three embodiments of the invention have been disclosed in the accompanying description, it will be evident that various other modifications are possible in the arrangement and construction of the disclosed vehicle soft field wheeled supporting gear without departing from the scope of the invention.

We claim:
1. A wheeled supporting gear comprising,
   (a) telescopic strut means for supporting a vehicle,
   (b) axle means for supporting said strut means,
   (c) two wheels relatively axially movably mounted on said axle means for supporting said axle means, each of said wheels having tires for supporting said wheels on the ground, and
   (d) hydraulic limiting means for said axle means for axially moving one of said wheels to a position spaced from the other wheel, said spaced distance being limited to substantially four radii of the tire contact area from said other of said wheels for providing an efficient soft field wheeled supporting gear for a vehicle.
2. A supporting gear as set forth in claim 1 wherein,
   (a) said axle means comprises two telescopic parts, each part carrying a wheel, one of said axle parts having a cylinder, the other of said parts having a piston actuatable in said cylinder, and
   (b) said hydraulic means supplying pressure fluid to said piston and cylinder for both extending said telescopic axle and contracting said telescopic axle.
3. A supporting gear as set forth in claim 1, wherein,
   (a) one of said wheels has brakes thereon,
   (b) connecting means between said wheels for preventing rotation of one wheel relative to the other wheel whereby braking effect from said brakes is transmitted to both wheels.
4. A supporting gear as set forth in claim 1, wherein,
   (a) said strut means comprises a first cylinder means telescopic within a second cylinder means,
   (b) an orifice plate means carried by said first cylinder means, and
   (c) floating metering rod means operable in said orifice plate means, said floating metering rod means being maintained fixed relative to said second cylinder means for a predetermined distance as said first cylinder means is telescoped in said second cylinder means for said predetermined distance to provide a low sink rate in the initial application of a load to said strut means to reduce rebound.
5. A supporting gear as set forth in claim 4 wherein,
   (a) said orifice plate means has at least one by-pass valve therein for providing increased damping in said strut means during telescopic movement through said predetermined distance.
6. A supporting gear as set forth in claim 4 wherein,
   (a) said first and second cylinder means have a plurality of liquid filled chambers therebetween, each of said chambers having at least one orifice, and
   (b) said first and second cylinder means comprising means for forcing said liquid from each of said plurality of liquid filled chambers after said first cylinder has telescoped through said predetermined distance for providing additional energy absorption.
7. An aircraft landing gear comprising,
   (a) a telescopic landing gear strut means for supporting an aircraft during takeoffs and landings,
   (b) axle means for supporting said strut means,
   (c) two wheels relatively axially movably mounted on said axle means for supporting said axle means, tires for said wheels for contacting the ground, and
   (d) hydraulic limiting means for said axle means for moving one of said wheels axially to a position spaced from the other wheel, said spaced distance being limited to substantially four radii of the tire contact area from the other of said two wheels for providing an efficient soft field landing gear.
8. An aircraft landing gear as set forth in claim 7 wherein,
   (a) said axle means comprises two telescopic parts, each part carrying a wheel, one of said axle parts having a cylinder, the other of said parts having a piston actuatable in said cylinder, and
   (b) said hydraulic means supplying fluid under pressure to said piston and cylinder for both extending said telescopic axle and contracting said telescopic axle.
9. An aircraft landing gear as set forth in claim 7 wherein,
   (a) one of said wheels has brakes thereon, and
   (b) connecting means between said wheels for preventing rotation of one wheel relative to the other wheel whereby braking effect from said brakes is transmitted to both wheels.
10. An aircraft landing gear as set forth in claim 7 wherein,
    (a) said strut means comprises a first cylinder means telescopic within a second cylinder means,
    (b) first stop means for limiting the travel of contraction of said first cylinder means within said second cylinder means,
    (c) second stop means for limiting the travel of extension of said first cylinder means from said second cylinder means,
    (d) said second stop means comprising a V-shaped cam surface on one of said cylinder means and a V-shaped cam follower on the other of said cylinder means operatively in engagement with each other for providing centering of one of said cylinder means relative to the other cylinder means.
11. An aircraft landing gear as set forth in claim 7 wherein,
    (a) said strut means comprises a first cylinder means telescopic within a second cylinder means, and
    (b) scissor links interconnecting both of said first and second cylinder means.
12. An aircraft landing gear comprising,
    (a) telescopic landing gear strut means for supporting an aircraft during take-offs and landings,
    (b) axle means for supporting said strut means,
    (c) two wheels axially movably mounted on said axle means for supporting said axle means, tires for said wheels for contacting the ground,
    (d) hydraulic means for said axle means for moving one of said wheels axially a distance of substantially four radii of the tire contact area from the other of said two wheels for providing an efficient soft field landing gear,
    (e) said strut means comprises a first cylinder means telescopic within a second cylinder means,
    (f) an orifice plate means carried by said first cylinder means, and
    (g) floating metering rod means operable in said orifice plate means, said strut means having floating piston means for maintaining said floating metering rod immovable relative to said second cylinder for a prede- termined distance as said first cylinder is telescoped within said second cylinder for said predetermined distance to provide a low sink rate during the initial landing stage of wheel contact with the ground to reduce rebound.

13. An aircraft landing gear as set forth in claim 7 wherein,
   (a) said strut means comprises aircraft jacking means, said jacking means comprises a first cylinder means telescopic with a second cylinder means, and
   (b) means for admitting fluid under pressure to one of said cylinders for extending said strut means to its maximum length for jacking the aircraft.

14. An aircraft landing gear as set forth in claim 12 wherein,
   (a) said orifice plate means has at least one by-pass valve therein for providing increased damping in said strut means during telescopic movement through said predetermined distance.

15. An aircraft landing gear as set forth in claim 12 wherein,
   (a) said first and second cylinder means have a plurality of liquid filled chambers therebetween, each of said chambers having at least one orifice, and
   (b) said first and second cylinder means comprising means for forcing said liquid from each of said plurality of liquid filled chambers upon continued telescopic movement of said cylinder means beyond said predetermined distance for providing additional energy absorption.

16. An aircraft landing gear as set forth in claim 12 wherein,
   (a) said first and second cylinder means have four liquid filled chambers therebetween, each of said chambers having at least one orifice, and
   (b) said first and second cylinder means comprising means for forcing said liquid from each of said four chambers upon continued telescopic movement of said cylinder means after said first cylinder means has telescoped through said predetermined distance for providing additional energy absorption.

17. An aircraft landing gear as set forth in claim 12 wherein,
   (a) said floating metering rod means comprises a piston on one end of an elongated metering rod operable in said first cylinder means and a guide plate means on the other end of said metering rod operable in said floating piston means.

18. An aircraft landing gear as set forth in claim 12 wherein,
   (a) said floating piston means comprises an elongated double tube on one side of a piston for simultaneous ingression of oleo fluid and egression of air.

19. An aircraft landing gear as set forth in claim 12 wherein,
   (a) said second cylinder means has an inner cylinder guide connected to the end opposite said first cylinder means, and
   (b) said floating piston means being operable in said cylinder guide for separaton of air in one end of said strut means from oleo fluid in the other end of said strut means.

20. An aircraft landing gear as set forth in claim 7 wherein,
   (a) said strut means comprises at least two struts on one side of the aircraft, each strut having an aircraft jacking means, each of said jacking means comprises a first cylinder means telescopic within a second cylinder means, and
   (b) means for admitting fluid under pressure to one of said cylinders for extending one of said struts to its maximum length for jacking the aircraft.

References Cited by the Examiner

UNITED STATES PATENTS

| | | | |
|---|---|---|---|
| 1,578,740 | 3/1926 | Kurelic | 244—103 |
| 1,853,232 | 4/1932 | Schwarz | 244—104 |
| 2,935,278 | 5/1960 | Lesley | 244—103 |
| 3,052,429 | 9/1962 | Simon et al. | 244—103 |

MILTON BUCHLER, *Primary Examiner.*

L. C. HALL, *Assistant Examiner.*